(12) United States Patent
Yahaba et al.

(10) Patent No.: US 9,333,590 B2
(45) Date of Patent: May 10, 2016

(54) JOINED HETEROGENEOUS MATERIALS AND JOINING METHOD THEREFOR

(75) Inventors: Takanori Yahaba, Wako (JP); Tsutomu Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 13/635,844

(22) PCT Filed: Feb. 21, 2011

(86) PCT No.: PCT/JP2011/053664
§ 371 (c)(1),
(2), (4) Date: Sep. 18, 2012

(87) PCT Pub. No.: WO2011/125376
PCT Pub. Date: Oct. 13, 2011

(65) Prior Publication Data
US 2013/0011183 A1    Jan. 10, 2013

(30) Foreign Application Priority Data

Apr. 2, 2010    (JP) .................................. 2010-086268

(51) Int. Cl.
*B23K 20/227* (2006.01)
*B23K 20/12* (2006.01)

(52) U.S. Cl.
CPC ......... *B23K 20/1265* (2013.01); *B23K 20/2275* (2013.01); *B23K 2203/20* (2013.01); *Y10T 403/477* (2015.01)

(58) Field of Classification Search
CPC ............. Y10T 403/477; B23K 20/122; B23K 20/1225; B23K 20/127; B23K 20/129

USPC ........................................ 403/270; 228/112.1
See application file for complete search history.

(56) References Cited

U.S. PATENT DOCUMENTS

| 7,667,158 | B2 * | 2/2010 | Dance et al. | ............. 219/121.66 |
| 2003/0042291 | A1 * | 3/2003 | Mahoney | ................... 228/112.1 |
| 2003/0116609 | A1 * | 6/2003 | Dracup et al. | ............. 228/112.1 |
| 2004/0074949 | A1 * | 4/2004 | Narita et al. | ................ 228/112.1 |

(Continued)

FOREIGN PATENT DOCUMENTS

| JP | 2001-212679 A | 8/2001 |
| JP | 2002-224861 A | 8/2002 |

(Continued)

OTHER PUBLICATIONS

International Search Report for PCT/JP2011/053664, mailing date of May 24, 2011.

(Continued)

*Primary Examiner* — Gregory Binda
*Assistant Examiner* — Jonathan Masinick
(74) *Attorney, Agent, or Firm* — Westerman, Hattori, Daniels & Adrian, LLP

(57) ABSTRACT

A joined heterogeneous material includes a carbon steel material and an aluminum material which have been joined via friction-stir welding. The region of a weld zone with a low lift-up amount in a plastic flow area created during friction-stir welding is located on one side of the aluminum material with respect to the weld zone, created by a welding probe. The region of the weld zone with a high plastic flow area lift-up amount is located on the other side of the aluminum material.

5 Claims, 5 Drawing Sheets

(56) References Cited

U.S. PATENT DOCUMENTS

| | | | |
|---|---|---|---|
| 2005/0072832 A1* | 4/2005 | Han et al. | 228/112.1 |
| 2006/0138197 A1 | 6/2006 | Aota et al. | |
| 2007/0210140 A1 | 9/2007 | Sayama et al. | |
| 2008/0029581 A1* | 2/2008 | Kumagai et al. | 228/101 |
| 2010/0089977 A1* | 4/2010 | Chen et al. | 228/114.5 |
| 2011/0214799 A1* | 9/2011 | Szymanski et al. | 156/73.5 |
| 2011/0308059 A1* | 12/2011 | Seo et al. | 29/428 |
| 2012/0125522 A1* | 5/2012 | Kato et al. | 156/73.5 |
| 2013/0112736 A1* | 5/2013 | Kato | 228/112.1 |

FOREIGN PATENT DOCUMENTS

| | | |
|---|---|---|
| JP | 2003-170280 A | 6/2003 |
| JP | 2003-266182 A | 9/2003 |
| JP | 2005-021931 A | 1/2005 |
| JP | 2006-192501 A | 7/2006 |
| JP | 2006-224146 A | 8/2006 |
| JP | 2007-237245 A | 9/2007 |
| JP | 2007-289988 A | 11/2007 |
| JP | 2009-126472 A | 6/2009 |
| WO | 2004/110692 A1 | 12/2004 |
| WO | 2005/092558 A1 | 10/2005 |

OTHER PUBLICATIONS

Notification of Transmittal of Translation of the International Preliminary Report on Patentabililty (Form PCT/IB/338) of International Application No. PCT/JP2011/053664 mailed Nov. 22, 2012 with Forms PCT/IB1373 and PCT/ISA/237.

Japanese Office Action dated May 20, 2014, issued in corresponding Japanese Patent Application No. 2012-509344 with English translation (4 pages).

* cited by examiner

EMBODIMENT

COMPARATIVE EXAMPLE

US 9,333,590 B2

JOINED HETEROGENEOUS MATERIALS AND JOINING METHOD THEREFOR

TECHNICAL FIELD

The present invention relates to friction stir welding for joining an aluminum material and a carbon steel material together.

BACKGROUND ART

There are known techniques for joining two metal materials together by a friction stir welding method, as disclosed in e.g., patent document 1 below. FIG. 9 shows a friction stir welding method disclosed in patent document 1.

As shown in FIG. 9, with an aluminum plate 102 placed on an aluminum plate 101, a welding probe 104 of a friction stir welding tool 103 is moved in a Y direction while rotating counterclockwise (in an X direction) so as to join the aluminum plate 101 and the aluminum plate 102 together.

The friction stir welding method described above is known to be applicable to joining materials of different types. The present inventors have attempted to join the aluminum plate 102 and a carbon steel plate, provided in place of the aluminum plate 101. In so doing, the aluminum plate 102 is placed on the carbon steel plate and then the welding probe 104 of the friction stir welding tool 103 is moved in the Y direction while rotating counterclockwise (in the X direction).

The inventors have conducted a tensile test on the plates joined together. A test result showed that a weld zone between the plates was broken under a tensile load lower than a target load. This means that the technique disclosed in patent document 1 is not suitable for joining the materials of different types together, and hence there is a need for a technique suitable for joining the materials of different types.

PRIOR ART LITERATURE

Patent Document

Patent Document 1: Japanese Laid-open Patent Publication No. 2006-192501

SUMMARY OF INVENTION

Technical Problem

An object of the present invention is to provide a technique suitable for joining materials of different types.

Solution to Problem

According to a first aspect of the present invention, there is provided a heterogeneous material comprising: a carbon steel material; an aluminum material placed on the carbon steel material; and a weld zone joining the carbon steel material and the aluminum material together, the weld zone being formed by a probe inserted through the aluminum material during the friction stir welding, the aluminum material having one side and an opposite side separated from the one side by the weld zone, the one side of the aluminum material undergoing a load greater than a load applied to the opposite side of the aluminum material when the heterogeneous material is used, wherein the weld zone has a cross-section orthogonal to an axis on which the probe moves, the cross-section including a plastic flow zone created during the friction stir welding, the plastic flow zone including a first raised region of small height and a second raised region of large height, the first raised region being located adjacent the one side of the aluminum material, the second raised region being located adjacent the opposite side of the aluminum material.

The present invention thus focuses on the heights of the first and second raised regions of the plastic flow zone. The weld zone includes a sound area having a first length which is small due to the large height of the second raised region, and a second length which is large due to the small height of the first raised region. Weld strength (tensile strength) increases with increase in length of the sound area. The first raised region of small height providing the large length of the sound area is located adjacent of the one side of the aluminum material because the one side of the aluminum material undergoes the load greater than the load applied to the opposite side of the aluminum material. This makes it possible to increase the overall strength of the heterogeneous material.

According to a second aspect of the present invention, there is provided a method for joining a carbon steel material and an aluminum material together by friction stir welding to provide a heterogeneous material, the heterogeneous material including a weld zone formed during the friction stir welding and joining the carbon steel material and the aluminum material together, the aluminum material having one side and an opposite side separated from the one side by the weld zone, the one side of the aluminum material undergoing a load greater than a load applied to the opposite side of the aluminum material when the heterogeneous material is used, the method comprising the steps of; placing the aluminum material on the carbon steel material; inserting a probe through the aluminum material; and performing the friction stir welding by rotating and moving the probe such that the probe is rotated relative to the one side of the aluminum material in a direction opposite a direction of movement of the probe.

In this second aspect of the present invention, the friction stir welding is performed in such a manner that the welding probe is rotated relative to the one side of the aluminum material in the direction opposite the direction of movement of the welding probe. On the one side of the aluminum material, a plastic flow zone of the weld zone provides a raised region of small height. Namely, on the one side of the aluminum material, the weld zone has a sound area having a length which is large due to the small height of the raised region. Thus, the one side of the aluminum material provides increased weld strength (tensile strength). As a result, the overall strength of the heterogeneous material can be increased.

DESCRIPTION OF EMBODIMENT

The preferred embodiment of the present invention is described below with reference to the accompanying drawings.

Embodiment

Figure 1:
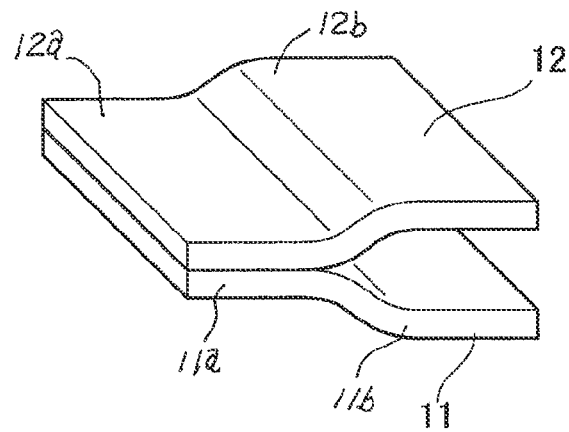
FIG. 1 is a view of the step of placing an aluminum material on a carbon steel material.

As shown in FIG. 1, an aluminum material 12 is placed on a carbon steel material 11 (a step of placing one of two different materials on the other). The carbon steel material 11 is a press-formed 270 MPa-class galvanized steel plate (JIS G 3302), for example. The carbon steel material 11 includes a flange part 11a and an adjacent part 11b contiguous with the flange part 11a. The aluminum material 12 includes a flange part 12a and an adjacent part 12b contiguous with the flange part 12a.

The aluminum material 12 is an aluminum alloy casting (AC4CH-T5 (JIS H 5202)), for example.

Figure 2:
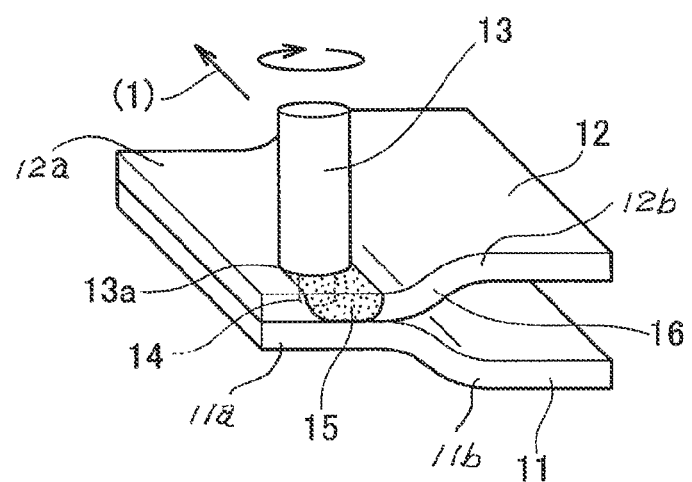
FIG. 2 is a view of the step of performing friction stir welding to join the aluminum material and the carbon steel material together.

As shown in FIG. 2, a welding probe 14 of a friction stir welding tool 13 is inserted through the aluminum material 12 and rotated at a high speed to perform friction stir welding (a step of joining the carbon steel material 11 and the aluminum material 12 together). The friction stir welding tool 13 includes a shoulder 13a supporting the welding probe 14. The shoulder 13a contacts a top surface of the aluminum material 12 or is slightly embedded in the aluminum material 12.

As shown in FIG. 2, a carbon steel material 11 has a plate-shape and an aluminum material 12 has a plate-shape. The aluminum material 12 is placed on the carbon steel material 11 in a superposed relation such that a bottom surface of the aluminum material 12 faces a top surface of the carbon steel material 11. The right side of the aluminum material 12 has a portion separated from the carbon steel material 11 such that a gap between the bottom surface of the aluminum material 12 and the top surface of the carbon steel material 11 increases with a distance from the weld zone 15. As shown in FIG. 2, the aluminum material 12 has a left side, a weld zone 15, and a right side separated from the left side by the weld zone 15. The left side of the aluminum material 12 is to undergo no load while the right side of the aluminum material 12 is to undergo a load. That is, the aluminum material 12 has a portion which is to undergo no load, and another portion which is to undergo a load. This portion which is to undergo the load is hereinafter referred to as a load application zone 16. In other words, no load is to be applied to the left side of the aluminum material while a load is to be applied to the right side of the aluminum material 12.

Figure 3:
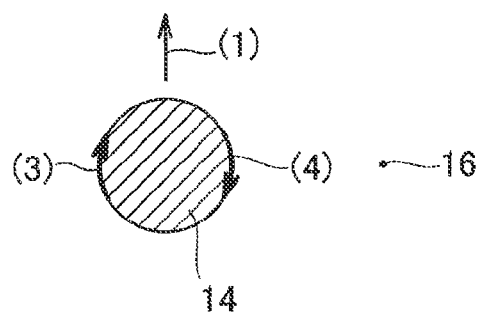
FIG. 3 is a view showing a positional relationship between a load application zone of the aluminum material and a rotational direction of a welding probe.

As shown in FIG. 3, when the welding probe 14 is moving in a traverse direction indicated by an arrow (1), a rotational direction indicated by an arrow (3) is the same as the direction of the movement of the welding probe 14. Meanwhile, the rotational direction indicated by an arrow (4) is opposite to the direction of the movement of the welding probe 14. In the present embodiment, the arrow (4) is on the same side as the load application zone 16. More specifically, during the step of joining the carbon steel material 11 and the aluminum material 12 together, the welding probe 14 is rotated relative to the load application zone 16 in a direction (the arrow (4)) opposite the direction of the movement of the welding probe 14.

Figure 4:
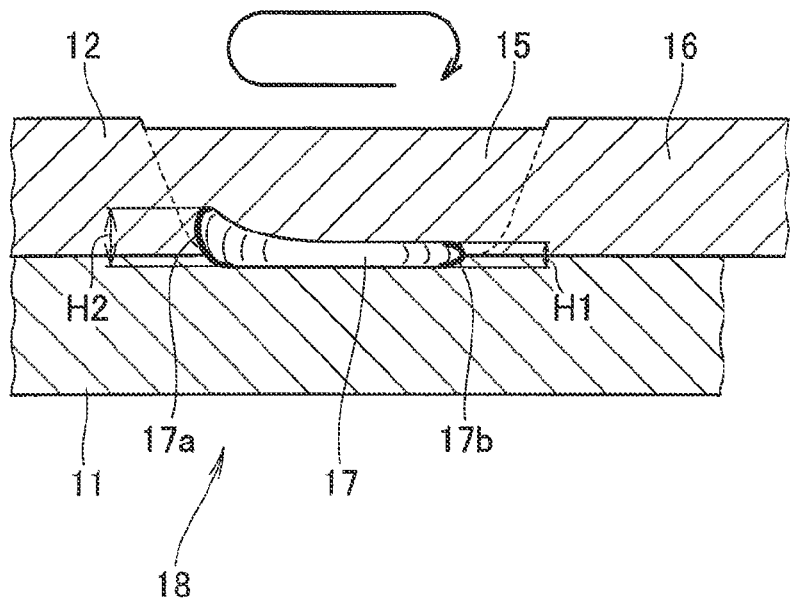
FIG. 4 is a cross-sectional view of raised regions of a plastically flowed portion of a weld zone.

Reference is made to FIG. 4, which is an enlarged cross-sectional view of the weld zone 15. The weld zone 15 has a plastic flow zone 17 at a bottom thereof. The plastic flow zone 17 has opposite ends defining raised regions 17a, 17b. In joining the carbon steel material 11 and the aluminum material 12 together, the friction stir welding tool rotates at a high speed such that a projected probe disposed at an end of the welding probe 14 (FIG. 2) is inserted through the aluminum material 12 until the shoulder 13a comes into contact with a top surface of the aluminum material 12. With the shoulder 13a held in contact with the top surface of the aluminum material 12, the rotating friction stir welding tool then moves producing a fluidized plastic flow zone 17 to join the carbon steel material 11 and the aluminum material 12 together. After the carbon steel material 11 and the aluminum material 12 are joined together, the plastic flow zone 17 is cooled into a solidified state.

During rotation of the friction stir welding tool 13, more specifically, the shoulder 13a (FIG. 2) and welding probe 14 (FIG. 2) generate heat due to friction with the material (aluminum material) 12. The materials, which are softened by this friction heat, are stirred and joined together by plastic flow caused by the rotation of the tool. During the joining of the materials, downward flow of the softened materials is produced by a thread formed on the probe 14 of the rotating tool 13. The downward flow of the softened materials is then blocked by the material (carbon steel material) 11 underlying the aluminum material 12. As a result, the softened materials spread outward and are directed toward the shoulder 13a. A softened material located around an outer edge of the plastic flow zone is then dragged and lifted up or raised. The raised material has a wedge shape penetrating into the top plate (aluminum material) 12. Such a phenomenon as lifting up or raising the softened material located outside the outer edge of the plastic flow zone is referred to as "lifting", and no weld joint is formed outside the raised material.

The top plate 12 has a thickness reduced by a height of the raised material penetrating into the top plate 12, and such a reduced thickness of the top plate 12 provides a reduced strength of the top plate 12.

Especially in joining materials of different types together, iron and/or anti-rust plating component (e.g., zinc (Zn)) located at an interface between the materials are dragged and raised during occurrence of the aforementioned "lifting". This is the reason why the raised regions 17a, 17b are conspicuously produced in the weld zone 15 between the aluminum material and the carbon steel material.

The raised region 17a, which is located far or opposite the load application zone 16, has a height H2 greater than a height H1 of the raised region 17b located adjacent the load application zone 16. The weld zone has a "sound" area above the plastic flow zone 17. This sound area of the weld zone 17 has a first length which is small due to the great height H2 of the raised region 17a and a second length which is large due to the small height H1 of the raised region 17b, as will be discussed later. Weld strength (tensile strength) increases with increase in length of the sound area. The magnitude of the weld strength will be described with reference to experiments discussed later.

A heterogeneous material 18 in the embodiment is summarized as follows.

The heterogeneous material 18 includes the carbon steel material 11, the aluminum material 12 placed on the carbon steel material 11, and the weld zone 15 joining the carbon steel material 11 and the aluminum material 12 together. The weld zone 15 is formed by the welding probe 14 inserted through the aluminum material 12 during the friction stir welding. The aluminum material 12 has the load application zone 16 (located adjacent the raised region 17b) and an opposite zone separated from the load application zone 16 by the weld zone 15 (and located adjacent the raised region 17a). The load application zone 16 of the aluminum material 12 undergoes a load greater than a load applied to the opposite zone of the aluminum material 12 when the heterogeneous material 18 is used. The weld zone 15 has a cross-section orthogonal to an axis (indicated by the arrow (1) of FIG. 2) on which the welding probe 14 moves. The cross-section includes the plastic flow zone 17 created during the friction stir welding, and the plastic flow zone 17 includes the raised region 17b of small height H1 and the raised region 17a of large height H2. The raised region 17b of the small height H1 is located adjacent the load application zone 16 of the aluminum material 12. The raised region of the large height H2 is located adjacent the opposite zone of the aluminum material 12.

A structure of the heterogeneous material 18 is suitable for use in a vehicle body frame, but can also be used in metal structures other than vehicles.

Experimentations show that the heterogeneous material 18 has a high strength. An exemplary one of these experimentations is described hereinbelow.

(Exemplary Experiment)

It is noted that the present invention is not limited to results of this experiment.

Preparation:

An aluminum material and carbon steel material shown in Table 1 were prepared.

TABLE 1

| Aluminum Material | Material Properties | AC4CH-T5 |
|---|---|---|
| | Thickness | 3.0 mm |
| Carbon Steel Material | Material Properties | 270 MPa-class galvanized steel plate |
| | Thickness | 2.0 mm |

Friction Stir Welding Tool:

A friction stir welding tool of size shown in Table 2 was prepared.

Joining:

The aluminum material and the carbon steel material were joined together under conditions shown in Table 2.

TABLE 2

| Friction Stir Welding Tool | Shoulder Diameter | 15 mm |
|---|---|---|
| | Probe Diameter | 7.0 mm |
| | Probe Length | 3.2 mm |
| Conditions | Rotational Speed | 1000 rpm |
| | Rotational Direction | Shown in FIG. 3 |
| | Moving Speed | 500 mm/min |

Figure 5:
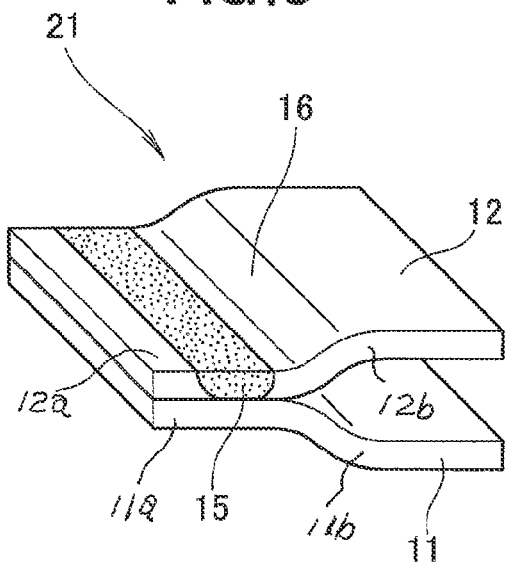
FIG. 5 is a perspective view of a heterogeneous material produced by joining the carbon steel material and the aluminum material together.
Figure 6:
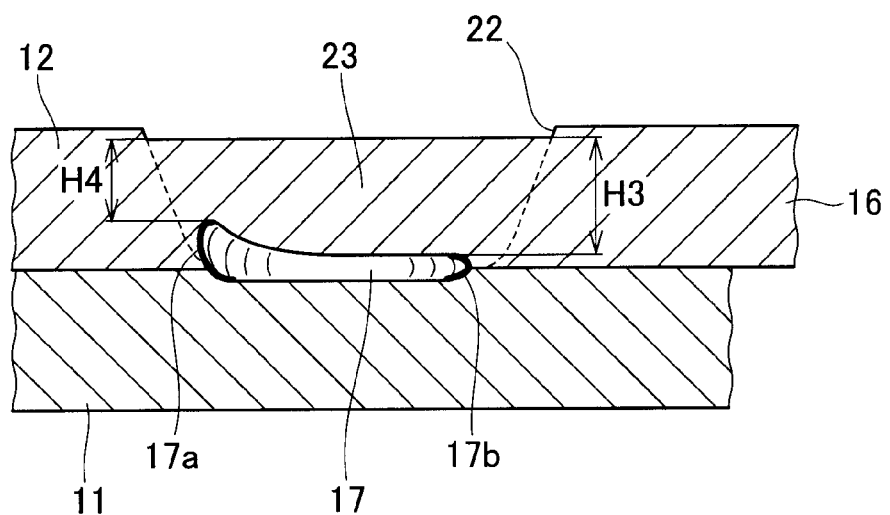
FIG. 6 is a cross-sectional view of the heterogeneous material, showing a length of a sound area of the heterogeneous material.

A sample piece 21 as shown in FIG. 5 was cut from the resultant heterogeneous material. Observation of a cross-section of the sample piece 21 indicated that the sample piece includes a depression 22, created by the shoulder of the friction stir welding tool, and raised regions 17a, 17b, as shown in FIG. 6. The aluminum material 12 has a "sound" area 23 between the depression 22 and the raised zones 17a, 17b.

A sound area length defined as a length from the depression 22 to the raised region 17b is designated by H3. A sound area length defined as a length from the depression 22 to the raised zone 17a is designated by H4. As shown in FIG. 6, the sound area length H4 is smaller than the sound area length H3.

Tensile testing was conducted, and the details thereof are described hereinbelow.

Figure 7A:
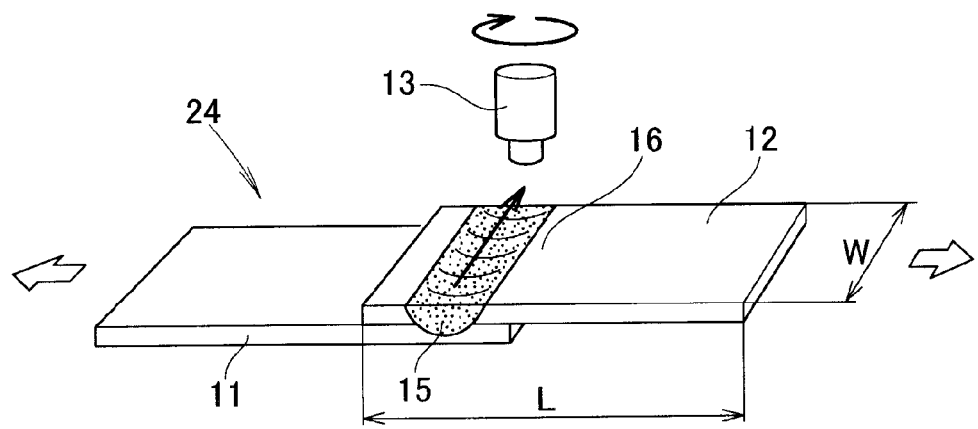
FIG. 7a and FIG. 7b are a view showing how to measure a tensile strength of the heterogeneous material, respectively.

As shown in FIG. 7(a), friction stir welding was performed by placing the aluminum material 12 on the carbon steel material 11 and moving the friction stir welding tool 13 rotating clockwise in a direction as indicated by a solid arrow. A width W of the aluminum material 12 was 25 mm, and a length L thereof was 100 mm. The sound area length H3 (FIG. 6) on the side of the load application zone of this sample piece 24 was measured.

A tensile load was applied to the sample piece 24 in a direction as indicated by an outline arrow, and a tensile load was recorded when the weld zone 15 was broken. For the sake of convenience, a tensile load (N) per 25 mm of width is referred to as the "tensile strength" (N/25 mm).

Seventeen sample pieces 24 were made, and the sound area length and tensile strength were measured for each of the seventeen sample pieces. The measured values are plotted as symbols (circles) in a graph of FIG. 8.

Figure 7B:
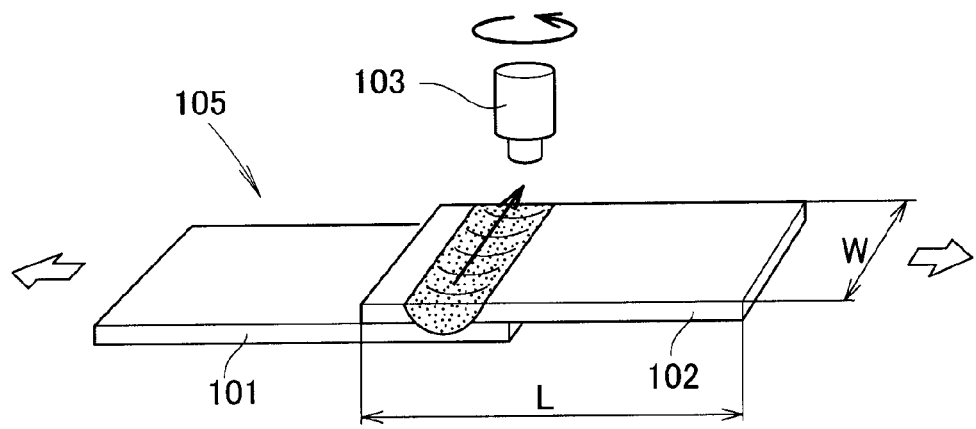

For comparison with the friction stir welding performed in a manner shown in FIG. 7(a), friction stir welding was also performed, as shown in FIG. 7(b), by placing an aluminum material 102 on a carbon steel material 101 and moving a friction stir welding tool 103 in a direction as indicated by a solid arrow, the tool 103 rotating in a counterclockwise direction opposite the direction of the rotation of the tool 13 shown in the embodiment shown in FIG. 7(b). A width W of the aluminum material 102 was 25 mm, and a length L thereof was 100 mm. Twenty three sample pieces 105 of the comparative example were made, and the sound area length and tensile strength were measured for each of the twenty-three sample pieces. The measured values are plotted as symbols (squares) in the graph of FIG. 8.

Figure 8:
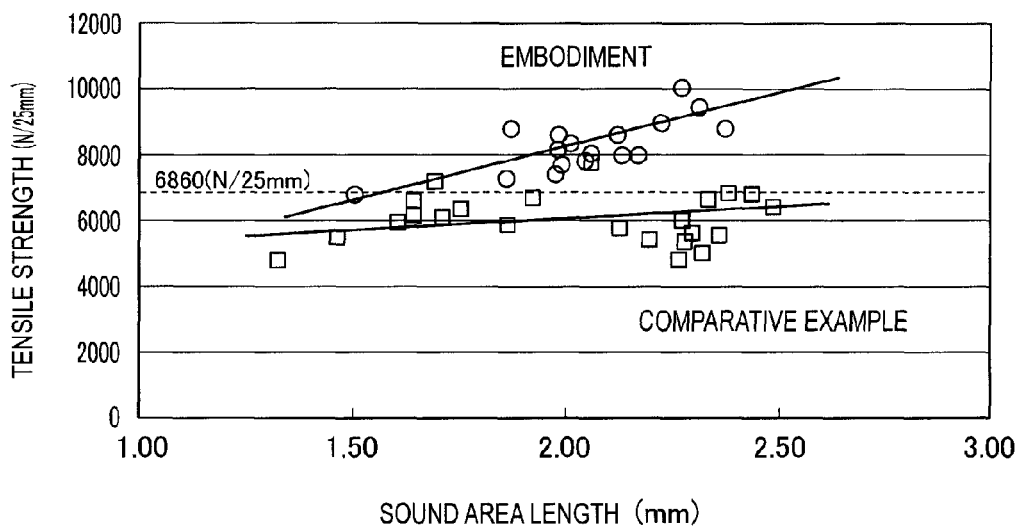
FIG. 8 is a view showing a relationship between the tensile strength and the length of the sound area of the heterogeneous material.
Figure 9:
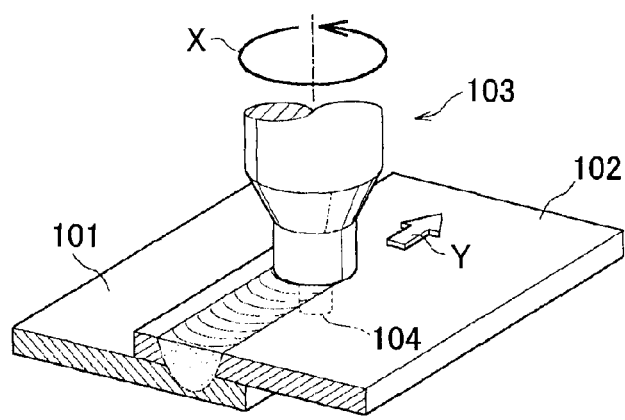
FIG. 9 is a view showing a conventional friction stir welding method for providing a heterogeneous material.

In FIG. 8, assuming that a required strength is 6860 N/25 mm, most of the samples from the comparative example of FIG. 7(b) provided a tensile strength less than the required strength, as indicated by the square symbols.

In contrast, all of the samples from the embodiment of FIG. 7(a) provided a tensile strength equal to or greater than the required strength, as indicated by the circle symbols.

The exemplary experiment above shows that the overall strength of the heterogeneous material can be increased by providing the small height of the raised region of the plastic flow zone located adjacent one side of the aluminum material to undergo a greater load, as shown in FIG. 4.

The heterogeneous material in the embodiment is suitable for use at weld sites of a vehicle body frame, but can also be used at the weld sites of metal structures other than vehicles.

INDUSTRIAL APPLICABILITY

The heterogeneous material of the present invention is suitable for use as weld sites of a vehicle body frame.

REFERENCE SIGNS LIST 11 carbon steel material
12 aluminum material
13 friction stir welding tool
14 welding probe
15 weld zone
16 load application zone
17 plastic flow zone
17a, 17b raised regions
18 heterogeneous material
H1, H2 heights of the raised regions of the plastic flow zone

The invention claimed is:

1. A heterogeneous material comprising:
a plate-shape carbon steel material;
a plate-shape aluminum material placed on the plate-shape carbon steel material in a superposed relation such that a bottom surface of the aluminum material faces a top surface of the carbon steel material; and
a weld zone joining the carbon steel material and the aluminum material together, the weld zone having been formed by a probe inserted through the aluminum material and moved in a direction while being rotated in one direction during the friction stir welding, the aluminum material having a first side and a second side separated from the first side by the weld zone, the first side of the aluminum material being adapted to be undergoing an exterior load greater than an exterior load applied to the second side of the aluminum material while the heterogeneous material is in use,
wherein the weld zone has a cross-section orthogonal to an axis on which the probe moves, the cross-section including a plastic flow zone created during the friction stir welding such that the plastic flow zone includes aluminum from the plate-shape aluminum material and iron from the plate-shape carbon steel material, the plastic flow zone including a first raised region having a first height and a second raised region having a second height larger than the first height, the first raised region having been formed during the friction stir welding on a first side of the probe where the rotating direction of the probe is opposite to the direction of movement of the probe, the first raised region being located at a first end of the plastic flow zone, the first end being located on the first side of the aluminum material, the second raised region having been formed during the friction stir welding on a second side of the probe, opposite to the first side, where the rotating direction of the probe is the same as the direction of movement of the probe, the second raised region being located at a second end of the plastic flow zone opposite to the first end, the second end being located on the second side of the aluminum material,
wherein the weld zone has a sound area above the plastic flow zone, wherein the sound area does not include the iron from the plate-shape carbon steel material, the sound area having a first sound area length defined as a length from an outer surface of the aluminum material from which the probe is inserted, to the first raised region and a second sound area length defined as a length from the outer surface of the aluminum material to the second raised region, the first sound area length being larger than the second sound area length,
wherein the second side of the aluminum material and a corresponding side of the carbon steel material together form an edge of the heterogeneous material, the weld zone extending in a direction along the edge of the heterogeneous material,
wherein the carbon steel material includes a first flange part extending along the edge of the heterogeneous material, and a first adjacent part contiguous with an end of the first flange part remote from the edge of the heterogeneous material and extending in a direction away from the edge of the heterogeneous material,
wherein the aluminum material includes a second flange part extending along the edge of the heterogeneous material, and a second adjacent part contiguous with an end of the first flange portion remote from the edge of the heterogeneous material and extending in the direction away from the edge of the heterogeneous material,
wherein the first flange part of the carbon steel material and the second flange part of the aluminum material are joined together by the weld zone, and the first adjacent part of the carbon steel material and the second adjacent part of the aluminum material are bent outwardly away from each other such that the heterogeneous material including the first and second flange parts and the first and second adjacent parts has a generally Y shape when viewed in a direction parallel to the edge of the heterogeneous material.

2. The heterogeneous material according to claim 1, wherein a length of the first side of the aluminum material is longer than a length of the second side of the aluminum material.

3. The heterogeneous material according to claim 1, wherein the first side of the aluminum material has a portion separated from the carbon steel material such that a gap between the bottom surface of the aluminum material and the top surface of the carbon steel material increases with a distance from the weld zone.

4. The heterogeneous material according to claim 1, wherein the weld zone constitutes a weld zone of a vehicle body frame.

5. The heterogeneous material according to claim 1, wherein the bent first adjacent part and the bent second adjacent part are disposed on the first raised region side of the weld zone.

* * * * *